United States Patent [19]

Tsujimoto et al.

[11] Patent Number: 5,595,947
[45] Date of Patent: Jan. 21, 1997

[54] SUBSTRATE MATERIALS FOR MAGNETIC HEAD

[75] Inventors: Shinji Tsujimoto, Osaka; Shin Mishima, Takarazuka; Shigeru Kawahara, Kusatsu; Toshiaki Wada, Takatsuki; Michito Miyahara, Fukuoka; Toyoshige Sasaki, Fukuoka; Shigeki Mohri, Fukuoka; Osamu Nakano, Fukuoka, all of Japan

[73] Assignees: Sumitomo Special Metals Co., Ltd., Osaka; Nippon Tungsten Co. Ltd., Fukuoka-ken, both of Japan

[21] Appl. No.: 434,833

[22] Filed: May 4, 1995

[30] Foreign Application Priority Data

May 14, 1994 [JP] Japan .................................. 6-124160
Mar. 10, 1995 [JP] Japan .................................. 7-051623

[51] Int. Cl.$^6$ ............................ C04B 35/56; C04B 35/58
[52] U.S. Cl. ................................. 501/87; 501/96; 501/98
[58] Field of Search ............................ 501/96, 97, 98, 501/87

[56] References Cited

U.S. PATENT DOCUMENTS

| | | | |
|---|---|---|---|
| 4,356,272 | 10/1982 | Kanemitsu et al. | 501/87 |
| 4,582,812 | 4/1986 | Furukawa et al. | 501/87 |
| 5,188,908 | 2/1993 | Nishiyama et al. | 501/98 |
| 5,376,466 | 12/1994 | Koyama et al. | 501/87 |
| 5,476,530 | 12/1995 | Gries et al. | 501/87 |
| 5,520,716 | 5/1996 | Takagi et al. | 501/87 |

*Primary Examiner*—Mark L. Bell
*Assistant Examiner*—Louis M. Troilo
*Attorney, Agent, or Firm*—Jordan and Hamburg

[57] ABSTRACT

Substrate materials for magnetic heads consisting of 24–75 mol % of $\alpha$-$Al_2O_3$ and the remaining 76–25 mol % of $TiC_xO_yN_z$ containing a small amount of additives, that has a NaCl-type structure which retain known characteristics required on such materials and have controlled sizes of crystallites of $Al_2O_3$ and $TiC_xO_yN_z$, uniformly dispersed $TiC_xO_yN_z$ crystallites and, if any, additive elements, in which internal stress is relieved. The materials are intended for eliminating problems in IBE to form steps and thus for fabricating high-precision thin-film heads for high-density recording.

6 Claims, No Drawings

SUBSTRATE MATERIALS FOR MAGNETIC HEAD

BACKGROUND OF THE INVENTION

1. Field of the Invention

The present invention relates to alumina-based substrate materials for magnetic heads with low flying height and suitable for precision working such as ion beam etching (IBE). The materials can be used in thin-film head sliders for hard disk drives in which the head is situated at a very small distance from the recording medium or transverse pressure contours (TPC) for thin-film tape recording devices, for example.

2. Description of the Prior Art

A typical construction of magnetic heads has been a two-rail design called the taper-flat type. Such heads have been mechanically worked, for example, using the grinding wheel. Therefore, characteristics required of materials for such heads include (1) chipping resistance in cutting and (2) ease of machining in cutting and lapping, as well as (3) low friction in contact start-stop (CSS), which depends on the lubrication characteristics of the material.

The characteristic (1) above is indispensable to form an air bearing surface (ABS), i.e. the contact surface between the magnetic head and the recording medium. A head with numerous chippings on the ABS has shown poor flying height and lubrication characteristics. Also, a material that tends to chip while being machined has required a low machining speed for precision machining for the ABS, and therefore the throughput of heads using such a material has been low.

The characteristic (2) above also relates chiefly to the throughput: a material difficult to cut and machine requires a prolonged period for ABS machining.

The characteristic (3) above relates to the reliability of the head: a material with poor lubrication tends not to be very durable when subjected to repeated CSS.

On the other hand, thin film heads have progressed from the conventional standard slider (100% slider, with a 4-mm thick substrate) to the micro-slider (70% slider, with a 2.8-mm thick substrate), nano-slider (50% slider, with a 2-mm thick substrate) and pico-slider (30% slider, with a 1.2-mm thick substrate). The femto-slider (10% slider, with a 0.4-mm thick substrate) is under development for future use. Miniaturization of the head entails reduction of the flying height from 0.3 µm through 0.2, 0.1 and 0.075 µm to 0.05 µm in the most recent models. The conventional two-rail taper-flat type sliders cannot cope with the low flying height necessitated by the miniaturization. To solve this problem, improved head sliders called TPC sliders have been introduced, which have a step 0.5–3 µm in height at either end of the rail, or ABS, formed by a physical machining process such as IBE. Surface roughness is an important factor determining the throughput of this type of head, which should generally be 1/10 times the machining depth, or 0.05–0.3 µm. Substrate materials for this type of head should therefore give a sufficiently smooth surface after machining.

Another progress aiming at higher recording densities is the introduction of magnetoresistive (MR) heads. This type of head employs a magnetic film that requires magnetic annealing at high temperatures such as sendust, which anneals at 600°–700° C. This reduces the bond strength between alumina and TiC particles and, consequently, makes the TiC particles tend to pull out during lapping of the ABS. Therefore, a requirement for the substrate is that TiC particles do not come off even after magnetic annealing. Another problem brought about by magnetic annealing is that deformation of the substrate causes deterioration of positioning accuracy in photolithography and of magnetic characteristics of the head. The substrate is therefore required to show only a minimal deformation, if any, during magnetic annealing. In addition, characteristics of MR heads are strongly affected by surface roughness because of thickness as low as several tens of nanometers. The device is formed on a substrate sputtered with an alumina film. Too thick an alumina film may lead to large warp during magnetic annealing at high temperatures. On the other hand, if the alumina film is thin, its quality will be easily affected by defects in the substrate. Since the size of defects in the substrate depends on the crystallite size, the crystallites should be as fine and uniformly dispersed as possible.

The inventors have proposed in JP 86/50906 a sintered body consisting of 30–50 wt % of (TiC+TiO$_2$) and alumina as the balance, to which is further added a small amount of a machinability agent such as MgO and Y$_2$O$_3$, a sintering aid. The inventors have also disclosed in JP 90/62511 a magnetic head material consisting of alumina partially substituted with MgO or other machinability agents containing 5–45 weight % of titanium carbide, ZrO$_2$, Y$_2$O$_3$, and AlN. More recently, JP 94/2618 discloses a ceramic material for magnetic head sliders consisting of 100 weight parts of a mixture of alumina with 5–40 wt % of titanium carbide, 0.01–5 weight parts each of Mn and Ti oxides, and Ga, Ba, Ce and Ni oxides.

While these materials do satisfy the requirements described in (1)–(3) above, they are not satisfactory as the materials for TPC sliders or magnetoresistative heads. Their surface roughness after etching is as great as 0.2–2 µm, or 1/5–1/4 times the etching depth (0.5–3 µm), thus failing to give a stable flying height. When a substrate made of these materials is lapped to form the ABS after magnetic annealing, TiC particles pull out to deteriorate the surface roughness by a factor of 2–5, which causes problems such as poor CSS characteristics or head crash. A substrate 3 inches in diameter and 2 mm thick annealed at 600°–700° C. has 5–20 µm of warp which greatly impairs positioning accuracy in photolithography and magnetic properties. These materials also have nonuniform grain size distributions which can bring about some large particles (20–100 µm) in the substrate, which may introduce large defects. Therefore, the materials do not meet the requirements for advanced magnetic heads. This is because of poor distribution of TiC in the material due to the absence of oxygen and nitrogen in TiC.

In short, conventional Al$_2$O$_3$-TiC substrates do not satisfy the requirements (1)–(3) above and, additionally, do not satisfy such requirements as (4) low surface roughness after IBE, (5) small and uniformly dispersed crystallites, and (6) low internal stress. Therefore, it is difficult to produce sliders for high-density recording such as TPC sliders with high throughput using such materials.

SUMMARY OF THE INVENTION

The object of the present invention is to provide materials for magnetic head substrates based on the system Al$_2$O$_3$-TiC$_x$O$_y$N$_z$ that meet the requirements presented in (4)–(6) above, while retaining the characteristics obtained so far, indicated by (1)–(3) above, and present a satisfactory surface after IBE, in order to allow production of sliders of low flying heights high recording density magnetic heads such as MR heads with TPC sliders.

Among the requirements for substrate materials for magnetic heads indicated in (1)–(6) above, (1), (2), (3) and (5) are related to volume and area ratios of $\alpha$-$Al_2O_3$ and $TiC_xO_yN_z$ in the material and can therefore be conveniently discussed in terms of volume percentages. However, characteristics related to other requirements depend upon the number of metal atoms such as Mg, Ca, Zr, Cr or rare earth elements, and therefore molar percentage is appropriate in discussion. Hereinafter, the composition is always expressed in molar percentage. In the present invention, 24–75 mol % of $\alpha$-$Al_2O_3$ corresponds to 40–85 vol %, and 76–25 mol % of $TiC_xO_yN_z$ to 60–15 vol %.

The most important factors in realizing the magnetic head materials according to the invention are $Al_2O_3$-$TiC_xO_yN_z$ materials with strongly bonded crystallites and $TiC_xO_yN_z$ crystallites as small as possible and uniformly dispersed. The difference in IBE rates of $Al_2O_3$ and TiC (125 and 90 Å/min, respectively) gives rise to a rather rough surface after etching in conventional $Al_2O_3$-TiC materials. The grain boundary between TiC and $Al_2O_3$ crystallites is etched still more rapidly. Hence, the grain size of TiC and its ratio to the grain size of $Al_2O_3$ should be as small as possible.

Another factor is related to the magnetic annealing temperature in the manufacturing process of magnetic heads. The annealing temperature for MR heads widely used for high density recording is as high as 600°–700° C., as compared with the maximum temperature of about 300° C. for conventional heads, which reduces the bonding strength between $Al_2O_3$ and TiC crystallites. This, in turn, causes TiC particles to pull out during lapping of the ABS, leading to poor CSS characteristics or head crash. In addition, release of remaining internal stress within the substrate during magnetic annealing causes an excessive warp of the substrate which impairs the accuracy of positioning in photolithography and magnetic characteristics. Therefore, desirable head materials should have fine and uniformly dispersed crystallites strongly bonded to each other and remaining internal stress as low as possible. Generally, an accepted upper limit of warp is 4 μm for a substrate 3" in diameter and 2 mm thick, which corresponds to an internal stress of 1 MPa. The present invention has, therefore, attained its object by revealing that the pulling out of TiC particles from the substrate material depends on the oxygen content of TiC (i.e. the value of Y in $TiC_xO_yN_z$); that the surface roughness of the material after physical machining such as IBE depends firstly on the crystallite size of $\alpha$-$Al_2O_3$ and $TiC_xO_yN_z$, the ratio of these crystallite sizes, and the degree of dispersion of $TiC_xO_yN_z$, and secondly on the amount and dispersion of compounds formed from minor components (i.e. components other than $Al_2O_3$ and $TiC_xO_yN_z$); and that the internal stress in the substrate is released during magnetic annealing to produce warp of the material; by controlling the composition, uniformity of dispersion of each component, and crystallite size; and by additional annealing for stress removal after sintering.

The present invention thus provides substrate materials for magnetic heads comprising a basic composition consisting of 24–75 mol % of $\alpha$-$Al_2O_3$ and the remaining 76–25 mol % of a NaCl-type phase with an average composition $TiC_xO_yN_z$, where $0.5 \leq X \leq 0.995$, $0.005 \leq Y \leq 0.30$, $0 \leq Z \leq 0.20$, and $0.505 \leq X+Y+Z \leq 1$, a compound containing 0.8–7.0 mol % with respect to 100 mol % of the basic composition of a metal selected from Mg, Ca, Zr and Cr, and a compound containing 0.03–0.8 mol % with respect to 100 mol % of said basic composition of at least one rare earth metal, the total concentration of the metal and rare earth elements being in a range of 0.83–7.03 mol %. The materials of the composition described above contain 2 mol % or less of $TiO_n$ where $n \leq 2$ in said basic composition, have an average crystallite size of 0.3–1.5 μm, and a ratio of the crystallite size of $TiC_xO_yN_z$ to that of $Al_2O_3$ of 0.3–1.0, a remaining internal stress of 1 MPa or less. Further, the materials of the composition have a uniformly dispersed structure in which any 9-μm² square area (3 μm ×3 μm) on the surface contains either at least one crystallite of, or one aggregate particle containing, $TiC_xO_yN_z$, or a part of said crystallite or aggregate particle.

The $Al_2O_3$-$TiC_xO_yN_z$ material according to the invention is, in particular, advantageously used in low flying height magnetic heads such as micro-, nano-, pico- or femto-sliders.

The substrate materials according to the invention can be prepared by grinding and screening $TiC_xO_yN_z$ which is obtained either by heating a mixture of components, selected from TiC, titanium oxides, titanium nitrides, titanium carbide oxides, carbon, titanium carbide nitrides, and titanium carbide oxide nitrides so that the content of oxygen and nitrogen conform to the compositions specified above, in vacuum or inert, CO, $CO_2$, $N_2$ or $CH_4$ atmosphere, or by gas phase synthesis from $TiCl_4$, $CH_4$, CO, N and $NH_3$.

Alternatively, the substrate materials according to the invention can be obtained by mixing uniformly in a milled titanium carbide and titanium oxide having a known oxygen, content binding carbon, free carbon and nitrogen, carbon powder, and, as needed, titanium nitride or other compounds to a specified composition, with $Al_2O_3$ and a small amount of additives, and drying and screening the resultant slurry so that the components do not segregate or coagulate, sintering said dried slurry by hot pressing or hot isostatic pressing in an atmosphere controlled so that the components TiC, $TiO_m$ ($m \leq 2$) and C release CO gas to attain the composition $TiC_xO_yN_z$ in the sintering stage of HP or preliminary sintering stage of HIP.

The $Al_2O_3$ powder used as a starting material should have a purity of 99.9% or higher, a maximum particle size of 2.5 μm or less, an average particle size of 1.5 μm or less, or preferably 1.0 μm or less, and as low concentrations as possible of magnetic metal elements such as Fe, Co or Ni.

Specified amounts of such an $Al_2O_3$ powder, $TiC_xO_yN_z$ or components to form $TiC_xO_yN_z$, and a small amount of additives containing at least one of MgO, CaO, $ZrO_2$ or $Cr_2O_3$ and at least one of the oxides of Y, Ce, Eu, Dy, Yb, or other rare earth metals are weighed, wet milled and mixed in a pulverizer protected against impurities, dried and screened to give a starting powder for sintering.

The process of milling and mixing described above should be performed so that the resultant particles have an average size of 1.5 μm or less or preferably 1 μm or less, and a maximum size of 3 μm or preferably 2 μm or less, while the drying process is conditioned so that the components do not coagulate or segregate, in order to obtain a uniformly dispersed powder for sintering. The powder for sintering is then formed into a thin plate, subjected to preliminary sintering in a non-oxidizing atmosphere such as CO or $N_2$ or an inert gas atmosphere such as Ar, and finally densified by HIP. Alternatively, the powder is placed in a graphite die and hot-pressed in a known manner in a non-oxidizing atmosphere such as CO or $N_2$, an inert gas atmosphere or vacuum. The sintered body obtained in HP or HIP as described above is further heat-treated at 1200°–1700° C. in an atmosphere similar to those mentioned above, and cooled at a controlled rate of 0.2°–7° C./min, to yield a substrate material for magnetic heads with relaxed internal stress.

$\alpha$-$Al_2O_3$ and $TiC_xO_yN_z$ form the matrix in the substrate materials for magnetic heads according to the invention, which may contain 2 mol % or less of a suboxide of titanium $TiO_n$ ($n \leq 2$). Oxygen in $TiC_xO_yN_z$ contributes to the bonding between $\alpha$-$Al_2O_3$ and $TiC_xO_yN_z$ and, consequently, lowering sintering temperature through exchange or sharing of oxygen atoms at the boundaries of the two component phases, whether $TiC_xO_yN_z$ has been in the starting material or formed during sintering. This in turn produces fine crystallites and strengthens the grain boundaries of the two component phases. Most of titanium oxide ($TiO_m$, $m \leq 2$), one of the starting materials of $TiC_xO_yN_z$, reacts with TiC, TiN, and/or nitrogen or carbon to form $TiC_xO_yN_z$ and CO, while a small part of it forms suboxides of titanium ($TiO_n$, $n \leq 2$) such as TiO or $Ti_2O_{3.03}$.

A part of titanium oxide ($TiO_m$, $m \leq 2$) may also react with $Al_2O_3$ during an increase in temperature during sintering and precipitate as $TiO_n$ during cooling after sintering.

The solubility limit of oxygen in TiC crystals is related to the carbon content in $TiC_xO_yN_z$, and also contributes to the strength of boundaries with $\alpha$-$Al_2O_3$, while nitrogen in $TiC_xO_yN_z$ inhibits its grain growth, producing a fine-grained structure. The value of y in $TiC_xO_yN_z$ should satisfy $0.005 \leq Y \leq 0.3$. If Y is smaller than 0.005, only an insufficient amount of oxygen is available for diffusion and bonding, which results in weak bonding to other components, low sinterability of the material at lower temperatures, large grain sizes, unsatisfactory dispersion of the phase, and weak boundaries with $\alpha$-$Al_2O_3$, thus increasing the number of particles that pull out during production of magnetic heads. With Y>0.3, oxygen reacts with diamond in the cutting blade used for machining the material to make cutting difficult, which leads to problems in the geometrical precision of the head (not the precision of ABS machining), such as chipping. Preferably Y should satisfy $0.02 \leq Y \leq 0.12$.

The carbon content X in $TiC_xO_yN_z$ should be in a range $0.5 \leq X \leq 0.995$ according to the invention. If X<0.5 the hardness of the product is very low and readily worn in CSS. The TiC-based phase with X greater than 0.995 will not accept a sufficient amount of oxygen and have only a weak bonding with $\alpha$-$Al_2O_3$, thus pulling out many particles during machining. Preferably X should satisfy $0.7 \leq X \leq 0.9$.

The nitrogen content z should satisfy $0 \leq Z \leq 0.20$. No grain growth inhibitor effect by nitrogen is available at Z=0, but a fine grain structure can still be achieved by careful control of sintering parameters. On the other hand, if Z>0.2 nitrogen reacts with diamond in the cutting wheel in precedence over oxygen, disturbing the cutting process and deteriorating machining and lapping behavior of the material. Preferably Z should satisfy $0.005 \leq Z \leq 0.07$. As a consequence, X+Y+Z should be in a range between 0.505 and 1, since $TiC_xO_yN_z$ is formed by substituting O and N for a part of C in TiC. To minimize reaction of the material with atmosphere in the head production process, it is desirable for X+Y+Z to be close to 1 where the lattice point in $TiC_xO_yN_z$ is saturated.

The molar percentage of the $TiC_xO_yN_z$ phase in the matrix is related to tribological characteristics of the head with the recording medium.

The concentration of $TiC_xO_yN_z$ should preferably be 25–76 mol %. At concentrations lower than 25 mol %, $Al_2O_3$ grains are not effectively prevented from growing, and similarly to pure $Al_2O_3$, cutting and lapping behavior is so poor that problems in the geometrical precision of the head (not the precision of ABS machining), such as chipping, are caused. Also, low electroconductivity of such compositions causes an to electrostatic charge from friction with the medium, which attracts dust and may induce head crash. On the other hand, concentrations higher than 76 mol % retards densification, and the resulting numerous small pores facilitate particle pull-out and prohibit formation of thin-film circuits on the surface, although the material itself can be precisely machined. More preferably, the concentration of $TiC_xO_yN_z$ should be 40–60 mol %.

With respect to 100 mol % of the matrix consisting of $Al_2O_3$ and $TiC_xO_yN_z$, or less than 2 mol % of $TiO_n$ ($n \leq 2$) in addition to these two components, the material according to the invention should contain 0.8–7.0 mol %, or preferably 0.8–3.5 mol %, of at least one metallic element selected from Mg, Ca, Zr and Cr, and 0.03–0.80 mol %, or preferably 0.03–0.20 mol %, of at least one rare earth metal such as Ce, Y, Eu, Dy or Yb, the total concentration of the metal and rare earth element being in a range of 0.83–7.03 mol %, preferably 0.83–2.5 mol %. If the concentration of Mg or other metals, the oxides of which suppress the grain growth of $Al_2O_3$ and reduce grinding force, is less than 0.8 mol %, the grinding force on machining of the material is excessively great. If the concentration is over 7.0 mol %, undesirable chipping appears. If the content of said rare earth metals, whose oxides are sintering aids, is under 0.03 mol %, its effects on sintering is small and the material will have large crystallites. Hence, chipping and particle pull-out in machining, will result, preventing the material from being used in thin-film heads. If the content exceeds 0.8 mol %, dispersion of the components becomes poor, leading to segregation or nonuniform distribution of $TiC_xO_yN_z$ crystallites. When the total content of the metal and rare earth elements is over 7.03 mol %, precision machining inhibited due to chipping, while using an amount that under 0.83 mol % renders the crystallites coarse and nonuniform, increases grinding force and lowers throughput.

Although these elements are most conveniently added as oxides to the starting materials, hydroxides, carbonates, or other organic or inorganic salts can also be used as far as they decompose to yield corresponding oxides during processing or sintering of the starting mixture.

The concentration of these additives are expressed in molar percentage of each metal throughout the specification, because they form a number of compound oxides and intermetallic compounds during sintering in a complicated manner. For example, Mg exists as MgO, $MgAl_2O_4$ (spinel), $MgTi_2O_5$ or other reaction products. Rare earth elements form oxides, garnets containing $Al_2O_3$, or intermetallics with at least one of Al, Mg, Ca, Zr and Cr. For instance Y forms $Y_2O_3$, yttrium aluminum garnet, YAl or $Y_2C_3$ reaction products.

The matrix consisting of $Al_2O_3$ and $TiC_xO_yN_z$, or consisting of less than 2 mol % of $TiO_n$ ($n \leq 2$) in addition to these two components should have an average crystallite size of 0.3–1.5 µm. Smaller crystallite sizes are favorable in principle, but average sizes less than 0.3 µm may cause particles to pull out on contact with the medium and thus head crash. Crystallites larger than 1.5 µm yields too rough a surface after etching. A still more preferable range of the average crystallite size of the matrix is 0.3–1.0 µm.

Physical machining such as IBE attacks $Al_2O_3$ more rapidly than $TiC_xO_yN_z$, and even more rapidly attacks grain boundaries. Large crystallites of $TiC_xO_yN_z$ remain therefore as large protrusions on the surface after etching. Considering this effect, the ratio of the crystallite size of $TiC_xO_yN_z$ to that of $Al_2O_3$ should be 1.0 or less. However, if this ratio is less than 0.3, the surface after etching will be rough again, even if the average crystallite size falls within the range shown above, because of relatively large $Al_2O_3$ particles whose diameter is 3.3 times or more that of $TiC_xO_yN_z$.

An important feature of the substrate materials according to the invention is uniform dispersion of $TiC_xO_yN_z$ crystallites. This is achieved, as described earlier, by properly controlling milling and mixing of the starting materials, preparation of sintering powder, and sintering. Problems caused by nonuniform crystallite distribution were also described earlier. When any part of the substrate material is precisely lapped and observed under an electron microscope at a magnification of 5000, if at least one crystallite or aggregate of $TiC_xO_yN_z$ that appears as a white spot is seen to be within a square area of 9 µm² (3 µm×3 µm), a precise etched surface can be obtained. Even when its concentration is decreased toward 25 mol % where white spots of $TiC_xO_yN_z$, now decreased in number, may not be observed within a 9 µm² area, a uniformly distributed structure can be formed by controlling the starting material or milling and mixing thereof as described above.

An additional feature of the present invention is to prevent the substrate from warping by annealing to remove as much internal stress as possible. It is known to anneal a ceramic substrate to some extent during cooling after HP. However, a very low cooling rate is required in this circumstance because the substrate is in contact with the sintering mold around it. It is more economical to anneal the substrate after sintering in a condition with little constraint on thermal expansion and contraction and remove internal stress nearly perfectly. The annealing temperature, which depends on the composition of the substrate, should be about 70% of the sintering temperature or higher. However, it is uneconomical, just as prolonged annealing at low temperatures, to heat the substrate again up to the sintering temperature, which may cause excessive grain growth. This factor limits the annealing temperature to lower than 95% of the sintering temperature. The annealing period depends on the annealing temperature; it is preferably 15 min to 10 h for annealing at 1200°–1700° C. Annealing shorter than 15 min does not relax the internal stress sufficiently, while the relaxation process saturates in one longer than 10 h, making the latter uneconomical. A still more preferable range of annealing condition is 30 min to 5 h at 1250°–1650° C.

The internal stress σ within the material after annealing is calculated by the equation $$\sigma = (B/A) \times (Et/r^2) \times \delta,$$

where A and B are constants depending on the geometry of the material (A=0.67 and B=1.24), E the Young's modulus of the material, t the thickness of the substrate, r the radius of a disk prepared from the material, and δ the warp of the disk during annealing at a temperature of 70% of or higher than the sintering temperature. The internal stress should preferably be lower than 1 MPa to limit warp during an additional annealing for quality assurance of the substrate at temperatures 70% of or higher than the sintering temperature. Internal stresses higher than 1 MPa result in a large deformation in the magnetic annealing of the substrate fabricated therefrom, thus greatly impairing the positioning accuracy in photolithography and characteristics of the magnetic film.

DESCRIPTION OF PREFERRED EMBODIMENTS

Compositions-Substrate materials for magnetic heads were prepared which consist of basic components comprising 24–75 mol % of $Al_2O_3$ and the remaining 76–25 mol % of $TiC_xO_yN_z$, at least one compound of a metallic element selected from Mg, Ca, Zr and Cr which provides 0.8–7.0 mol % of said metallic element(s) with respect to 100 mol % of said matrix, and at least one rare earth compound which provides 0.03–0.80 mol % of said rare earth element(s) with respect to 100 mol % of said matrix, the total concentration of the metal and rare earth element being in a range of 0.83–7.03 mol %, and matrix containing 2.0 mol % or less of $TiO_n$ (n≦2) in addition to $Al_2O_3$ and $TiC_xO_yN_z$.

Preparation of powders—The starting materials listed below were mixed to give the compositions shown in Tables 4, 5 and 6.

$TiC_xO_yN_z$ powder, to produce TiC, $TiO_2$, TiN and C were mixed in proportions that satisfy $0.5 \leq X \leq 0.995$, $0.005 \leq Y \leq 0.30$, $0 \leq Z \leq 0.20$ and $0.505 \leq X+Y+Z \leq 1$, heated to 500°–1500° C. in vacuum or in an inert or nonoxidizing atmosphere to produce a cake of $TiC_xO_yN_z$, which was then ground in a ball mill to an average particle size of 1.5 µm or less and a maximum particle size of 3 µm or less.

Powders with a purity of 99.95% or higher, an average particle size of 0.6 µm, and a maximum particle size of 3 µm or less were used to make $Al_2O_3$ powder.

Additional components (oxides of Mg, Ca, Zr and Cr, and oxides of Y, Ce, Eu, Dy and Yb). Were made using powders with a purity of 99% or higher and an average particle size of 1.5 µm or less.

Powders with a purity of 99% or higher and an average particle size of 1 µm or less were used to make carbon powder.

The starting powders listed above were mixed and wet-ground, in a ball mill or a high-performance pulverizer protected against extraneous impurities, to an average particle size of 1.0 µm or less and a maximum particle size of 2 µm, and passed through a 5 µm filter to remove fragments of grinding medium, if any. Since $TiC_xO_yN_z$ is ground more rapidly than $Al_2O_3$ in this grinding process, a slurry with a particle size specified above is obtained. Said slurry was dried, for example within a spray granulator, in a short period so that no separation of a component occurred, and screened to give a powder for sintering.

Compaction and sintering-dense sintered bodies were prepared either by pressing said powder for sintering in a mold with specified dimensions to form plate-like compacts, preliminarily sintering the compacts to a relative density of 95–98.5% under the conditions shown in Table 1, and performing HIP; or by filling said powder uniformly in a graphite mold, and preforming HP under the conditions shown in Table 1.

TABLE 1

| | Preliminary sintering | Full sintering |
| --- | --- | --- |
| HP | None | Sintering temp.: 1500° C.–1800° C. Sintering time: 60–120 min. |

TABLE 1-continued

| | Preliminary sintering | Full sintering |
|---|---|---|
| HIP | Compaction pressure: 1 ton/cm² <br><br> Sintering temp.: 1650–1850° C. <br> Sintering time: 60–120 min. <br> Sintering atmosphere: Argon | Sintering pressure: 100–300 kg/cm² <br> Sintering atmosphere: Argon <br> Sintering temp.: 1400° C.–1600° C. <br> Sintering time: 60–120 min. <br> Sintering pressure: 500–2000 kg/cm² <br> Sintering atmosphere: Argon |

The lowest temperatures acceptable for densification were chosen for HIP and HP described above to avoid excessive sintering. Detailed conditions are shown in Table 1.

The sintered bodies obtained showed relative densities higher than 99%, no segregation of additive elements such as Mg and rare earths, uniform distribution of $Al_2O_3$ and $TiC_xO_yN_z$ crystallites, average crystallite sizes of 0.3–1.5 μm, ratios of the average crystallite size of $TiC_xO_yN_z$ to that of $Al_2O_3$ of 0.3–1.0, and a fine, uniform grain structure.

The sintered bodies were annealed in a furnace at 1200°–1700° C. for at least 15 min in an argon atmosphere and subsequently cooling. An example of the annealing conditions is shown in Table 2.

TABLE 2

| Annealing temperature | Annealing time | Cooling rate | Atmosphere |
|---|---|---|---|
| 1400° C. | 4 Hr | 1° C./min. | Argon |

The thickness of the sintered bodies had been given an allowance for deformation due to stress relaxation during annealing, and both faces of the bodies after annealing were machined to yield substrate materials with a specified thickness.

The materials thus obtained showed no change in crystallite size during annealing. The relaxation of the internal stress prevented excessive deformation during subsequent processes to prepare substrates for magnetic heads.

Evaluation of sintered bodies-Table 1 shows the conditions of compaction and sintering, and Table 2 those of annealing after sintering.

Table 3 shows, for comparison, compositions of conventional substrate materials for magnetic heads.

Table 4 shows, for comparison, compositions of substrate materials for magnetic heads not covered by the present invention.

Table 5 shows compositions of materials both within and without the scope of the invention.

Tables 6 and 7 shows compositions of sintered bodies according to the invention intended for substrates for magnetic heads.

Table 8 shows, as a reference, examples of compositions expressed in various units for a particular set of values X, Y, Z in $TiC_xO_yN_z$.

Table 9 summarizes the results of evaluation of substrate materials for magnetic heads according to the invention and those not covered by the invention.

The crystallite sizes cited in the table were measured on electron photomicrographs at a magnification of 5000 of fracture surfaces of the materials.

Table 10 shows the detailed evaluation criteria.

TABLE 3

| | Composition in weight % (mol %) | | | Additives in weight part (mol % M) | | Sintering method |
|---|---|---|---|---|---|---|
| | $Al_2O_3$ | TiC | $TiO_2$ | MgO | $Y_2O_3$ | |
| 1 | 63 (50.6) | 33.3 (45.6) | 3.7 (3.8) | 5.0 (10.17) | 0.25 (0.18) | HP |
| 2 | 63 (50.6) | 33.3 (45.6) | 3.7 (3.8) | 2.0 (4.07) | 0.25 (0.18) | HP |
| 3 | 63 (50.6) | 33.3 (45.6) | 3.7 (3.8) | 1.0 (2.03) | 0.25 (0.18) | HP |
| 4 | 63 (50.6) | 33.3 (45.6) | 3.7 (3.8) | 0.5 (1.02) | 0.25 (0.18) | HP |
| 5 | 63 (50.6) | 33.3 (45.6) | 3.7 (3.8) | 1.0 (2.03) | 2.00 (1.45) | HP |
| 6 | 63 (50.6) | 33.3 (45.6) | 3.7 (3.8) | 1.0 (2.03) | 1.00 (0.73) | HP |
| 7 | 63 (50.6) | 33.3 (45.6) | 3.7 (3.8) | 1.0 (2.03) | 0.50 (0.36) | HP |
| 8 | 63 (50.6) | 33.3 (45.6) | 3.7 (3.8) | 1.0 (2.03) | 0.10 (0.07) | HP |
| 9 | 63 (50.6) | 33.3 (45.6) | 3.7 (3.8) | 1.0 (2.03) | 0.05 (0.04) | HP |

Notes:
1) The compositions shown relate to the powders for sintering.
2) The proportions of MgO or other additives are with respect to $Al_2O_3 + TiC + TiO_2 = 100$ weight parts.
3) The molar percentages of the metallic element are with respect to $Al_2O_3 + TiC + TiO_2 = 100$ mol %.

TABLE 4

| | mol % | | Mol % of metals derived from additives | | | | | | | | | $TiC_XO_YN_Z$ | | | Sintering |
|---|---|---|---|---|---|---|---|---|---|---|---|---|---|---|---|
| No. | $Al_2O_3$ | $TiC_X$ $O_YN_Z$ | Mg (MgO) | Ca (CaO) | Zr ($ZrO_2$) | Cr ($Cr_2O_3$) | Ce ($Ce_2O_3$) | Y ($Y_2O_3$) | Eu ($Eu_2O_3$) | Dy ($Dy_2O_3$) | Yb ($Yb_2O_3$) | X | Y | Z | method |
| 10 | 46.84 | 53.16 | | | | | | | | | | 0.995 | 0.002 | 0.002 | HP |
| 11 | 52.55 | 47.45 | 15.00 | | | | | 0.80 | | | | 0.990 | 0.004 | 0.002 | HP |
| 12 | 52.54 | 47.46 | | | | 1.50 | 1.50 | | | | | 0.950 | 0.040 | 0.002 | HIP |
| 13 | 20.95 | 79.05 | | 2.00 | | | | | | 0.80 | | 0.700 | 0.100 | 0.004 | HP |
| 14 | 81.14 | 18.86 | | | 2.00 | | | | | | 0.80 | 0.950 | 0.005 | 0.005 | HIP |
| 15 | 52.83 | 47.17 | 4.00 | | | | | | | 0.40 | | 0.550 | 0.100 | 0.250 | HP |
| 16 | 52.72 | 47.28 | | | | 5.00 | 1.50 | | | | | 0.950 | 0.005 | 0.005 | HP |
| 17 | 52.72 | 47.28 | | | 2.00 | | | | | | 0.40 | 0.950 | 0.005 | 0.005 | HP |
| 18 | 52.51 | 47.49 | 3.00 | | | | | 1.00 | | 0.80 | | 0.700 | 0.250 | 0.010 | HP |
| 19 | 53.01 | 46.99 | | | 2.00 | | | | | 0.80 | | 0.450 | 0.250 | 0.150 | HP |

Notes:
1) $Al_2O_3$ powder as the starting material of No. 16–No. 18 is the same as the one used in the embodiment.
2) The average particle size of $TiC_XO_YN_Z$ used in No. 16–No. 18 is 3.5 μm.
3) The molar percentage of metallic elements are with respect to $Al_2O_3$ + $TiC_XO_YN_Z$ = 100 mol %.
4) The molecular formulas in parentheses indicate the species of the starting powders.

TABLE 5

| | mol % | | Mol % of metals derived from additives | | | | | | | | |
|---|---|---|---|---|---|---|---|---|---|---|---|
| No. | $Al_2O_3$ | $TiC_X$ $O_YN_Z$ | Mg (MgO) | Ca (CaO) | Zr ($ZrO_2$) | Cr ($Cr_2O_3$) | Ce ($Ce_2O_3$) | Y ($Y_2O_3$) | Eu ($Eu_2O_3$) | Dy ($Dy_2O_3$) | Yb ($Yb_2O_3$) |
| 18-1 | 23.0 | 77.0 | 1.0 | | | | | 0.05 | | | |
| 18-2 | 77.0 | 23.0 | 1.0 | | | | | 0.05 | | | |
| 18-3 | 75.0 | 25.0 | 1.0 | | | | | 0.05 | | | |
| 18-4 | 52.51 | 47.49 | 0.7 | | | | | 0.05 | | | |
| 18-5 | 52.51 | 47.49 | 7.5 | | | | | 0.03 | | | |
| 18-6 | 52.51 | 47.49 | 1.0 | | | | | 0.02 | | | |
| 18-7 | 52.51 | 47.49 | 1.0 | | | | | 0.85 | | | |
| 18-8 | 52.51 | 47.49 | 7.0 | | | | | 0.05 | | | |
| 18-9 | 52.51 | 47.49 | 7.0 | | | | | 0.03 | | | |
| 18-10 | 52.51 | 47.49 | 6.8 | | | | | 0.05 | | | |
| 18-11 | 52.51 | 47.49 | 0.7 | | | | | 0.03 | | | |
| 18-12 | 52.51 | 47.49 | 0.8 | | | | | 0.03 | | | |
| 18-13 | 52.51 | 47.49 | 1.0 | | | | | 0.05 | | | |
| 18-14 | 52.51 | 47.49 | 1.0 | | | | | 0.05 | | | |
| 18-15 | 52.51 | 47.49 | 1.0 | | | | | 0.05 | | | |
| 18-16 | 52.51 | 47.49 | 1.0 | | | | | 0.05 | | | |

Notes:
1) The values of X, Y and Z in No. 18-1 to No. 18-12 are identical with those in No. 18 in Table 4; the average particle size was 1.3 μm.
2) X = 0.995, Y = 0.002, Z = 0.002 in $TiC_XO_YN_Z$ used in No. 18-13.
3) X = 0.996, Y = 0.002, Z = 0.001 in $TiC_XO_YN_Z$ used in No.18-14.
4) X = 0.600, Y = 0.35, Z = 0.002 in $TiC_XO_YN_Z$ used in No. 18-15.
5) X = 0.700, Y = 0.04, Z = 0.25 in $TiC_XO_YN_Z$ used in No.18-16.
6) All specimens were sintered by HP. Notes 2) and 3) to Table 4 apply here.

TABLE 6

| | mol % | | Mol % of metals derived from additives | | | | | | | | |
|---|---|---|---|---|---|---|---|---|---|---|---|
| No. | $Al_2O_3$ | $TiC_X$ $O_YN_Z$ | Mg (MgO) | Ca (CaO) | Zr ($ZrO_2$) | Cr ($Cr_2O_3$) | Ce ($Ce_2O_3$) | Y ($Y_2O_3$) | Eu ($Eu_2O_3$) | Dy ($Dy_2O_3$) | Yb ($Yb_2O_3$) |
| 20 | 46.41 | 53.59 | 2.00 | | | | | 0.03 | | | |
| 21 | 47.04 | 52.96 | | 0.80 | | | | | | | 0.03 |
| 22 | 46.99 | 53.01 | | | 2.00 | | | | | 0.03 | |
| 23 | 47.52 | 52.48 | 4.00 | | | | 0.40 | | | | |
| 24 | 46.84 | 53.16 | 4.00 | | | 2.00 | | | 0.80 | | |
| 25 | 46.77 | 53.23 | 1.00 | | | | | 0.20 | | | |
| 26 | 47.24 | 52.76 | | 5.00 | 1.60 | | 0.20 | | | 0.20 | |

TABLE 6-continued

| | mol % | | Mol % of metals derived from additives | | | | | | | | |
|---|---|---|---|---|---|---|---|---|---|---|---|
| No. | $Al_2O_3$ | $TiC_XO_YN_Z$ | Mg (MgO) | Ca (CaO) | Zr ($ZrO_2$) | Cr ($Cr_2O_3$) | Ce ($Ce_2O_3$) | Y ($Y_2O_3$) | Eu ($Eu_2O_3$) | Dy ($Dy_2O_3$) | Yb ($Yb_2O_3$) |
| 27 | 46.88 | 53.12 | | | 1.00 | | | 0.20 | | | |
| 28 | 47.04 | 52.96 | | 1.00 | | | | | | | 0.20 |
| 29 | 47.37 | 52.63 | 1.00 | | 0.20 | | | 0.20 | | | |
| 30 | 24.10 | 75.90 | 1.00 | | 2.00 | | | 0.20 | | | |
| 31 | 52.44 | 47.56 | | | 2.00 | | | | 0.03 | | |
| 32 | 52.40 | 47.60 | | | | 1.00 | | | | 0.03 | |
| 33 | 52.48 | 47.52 | 1.00 | | | | | | | | 0.03 |
| 34 | 52.54 | 47.46 | | 1.00 | | | 0.03 | | | | |
| 35 | 52.58 | 47.42 | | 1.00 | | | | 0.03 | | | |
| 36 | 72.88 | 27.12 | 1.00 | | | | | 0.03 | | | |
| 37 | 52.48 | 47.52 | 1.00 | | | | | 0.03 | | | |
| 38 | 52.64 | 47.36 | 1.00 | | | | | 0.20 | | | |
| 39 | 52.52 | 47.48 | 1.00 | | | | 0.20 | | 0.20 | | |
| 40 | 52.57 | 47.43 | 1.00 | | | | | | | | 0.20 |

Notes:
1) The molar percentage of metallic elements (including rare earths) are with respect to $Al_2O_3 + TiC_XO_YN_Z = 100$ mol %.
2) The molecular formulas in parentheses indicate the species of the starting powders.

TABLE 7

| | $TiC_XO_YN_Z$ | | | |
|---|---|---|---|---|
| No. | X | Y | Z | Sintering method |
| 20 | 0.990 | 0.005 | 0.004 | HP |
| 21 | 0.950 | 0.005 | 0.002 | HP |
| 22 | 0.850 | 0.100 | 0.000 | HP |
| 23 | 0.850 | 0.010 | 0.002 | HP |
| 24 | 0.800 | 0.150 | 0.020 | HIP |
| 25 | 0.850 | 0.120 | 0.020 | HIP |
| 26 | 0.900 | 0.010 | 0.005 | HIP |
| 27 | 0.750 | 0.200 | 0.005 | HIP |
| 28 | 0.600 | 0.300 | 0.005 | HIP |
| 29 | 0.520 | 0.300 | 0.020 | HIP |
| 30 | 0.750 | 0.010 | 0.200 | HP |
| 31 | 0.800 | 0.150 | 0.040 | HP |
| 32 | 0.750 | 0.200 | 0.040 | HP |
| 33 | 0.850 | 0.100 | 0.040 | HP |
| 34 | 0.800 | 0.150 | 0.020 | HP |
| 35 | 0.850 | 0.100 | 0.020 | HP |
| 36 | 0.930 | 0.050 | 0.010 | HP |
| 37 | 0.850 | 0.100 | 0.040 | HIP |
| 38 | 0.850 | 0.100 | 0.010 | HIP |
| 39 | 0.830 | 0.100 | 0.050 | HIP |
| 40 | 0.970 | 0.010 | 0.010 | HIP |

Notes:
1) Values X, Y and Z in $TiC_XO_YN_Z$ were determined by analysis of C (IR absorption), N and O as well as X-ray difraction.

TABLE 8

| Ex. No. | $Al_2O_3$ | | | $TiC_{0.85}O_{0.12}N_{0.02}$ | | | Mg | MgO | Y | $Y_2O_3$ |
|---|---|---|---|---|---|---|---|---|---|---|
| | mol % | vol. % | wt. % | mol % | vol. % | wt. % | mol % | wt. % | mol % | wt. % |
| a | 23.98 | 40.00 | 34.79 | 76.02 | 60.00 | 65.21 | 0.8 | 0.46 | 0.03 | 0.05 |
| b | 23.98 | 40.00 | 34.79 | 76.02 | 60.00 | 65.21 | 7.00 | 4.02 | 0.03 | 0.05 |
| c | 72.83 | 85.00 | 81.93 | 27.17 | 15.00 | 18.07 | 1.00 | 0.45 | 0.80 | 1.00 |
| d | 72.83 | 85.00 | 81.93 | 27.17 | 15.00 | 18.07 | 7.00 | 3.11 | 0.03 | 0.04 |

Notes:
1) MgO and Mg are presented here as an example of additives and the metals contained therein.
2) Y and $Y_2O_3$ are presented here as an example of rare earth additives and the metals contained therein.

TABLE 9

| No. | Crystallite size | $TiC_XO_YN_Z$ $Al_2O_3$ | Resistance to particle pull-out | CSS characteristics | Geometrical precision | Surface roughness after IBE | Warp | Hardness | Machinability | Chipping | General evaluation |
|---|---|---|---|---|---|---|---|---|---|---|---|
| *1 | 1.20 | — | Δ | O | x | x | x | O | O | O | x |
| *2 | 1.00 | — | Δ | O | Δ | x | x | O | O | O | x |
| *3 | 0.70 | — | O | O | O | x | x | O | O | O | x |
| *4 | 0.70 | — | O | O | O | Δ | x | O | O | O | x |
| *5 | 0.90 | — | Δ | O | Δ | x | x | O | O | O | x |
| *6 | 0.85 | — | Δ | O | Δ | x | x | O | O | O | x |

TABLE 9-continued

| No. | Crystallite size | TiC$_x$O$_y$N$_z$ Al$_2$O$_3$ | Resistance to particle pull-out | CSS characteristics | Geometrical precision | Surface roughness after IBE | Warp | Hardness | Machinability | Chipping | General evaluation |
|---|---|---|---|---|---|---|---|---|---|---|---|
| *7 | 0.80 | — | △ | ○ | △ | x | x | ○ | ○ | ○ | x |
| *8 | 0.75 | — | ○ | ○ | ○ | x | x | ○ | ○ | ○ | x |
| *9 | 0.65 | — | ○ | ○ | ○ | △ | x | ○ | ○ | ○ | x |
| *10 | 1.60 | 0.65 | x | ○ | x | ○ | ◎ | ○ | x | ○ | x |
| *11 | 1.35 | 1.10 | △ | ○ | △ | x | ◎ | x | ○ | x | x |
| *12 | 1.15 | 1.05 | △ | △ | △ | x | ◎ | △ | ○ | ○ | x |
| *13 | 0.95 | 0.95 | △ | △ | △ | △ | ◎ | ○ | ○ | x | △ |
| *14 | 1.50 | 0.90 | x | x | △ | △ | ◎ | △ | x | x | x |
| *15 | 0.85 | 1.05 | △ | ○ | △ | ○ | x | ○ | x | △ | x |
| *16 | 1.90 | 1.55 | △ | ○ | x | x | ◎ | ○ | ○ | ○ | x |
| *17 | 1.45 | 1.25 | △ | ○ | △ | x | ◎ | ○ | ○ | ○ | x |
| *18 | 1.25 | 1.20 | △ | ○ | ○ | x | ◎ | ○ | ○ | ○ | x |
| *18-1 | 0.90 | 0.95 | ○ | △ | △ | △ | ◎ | ○ | ○ | △ | △ |
| *18-2 | 1.35 | 0.80 | △ | △ | △ | △ | ◎ | △ | △ | △ | △ |
| 18-3 | 1.00 | 1.00 | ○ | ○ | ○ | ○ | ◎ | ○ | ○ | ○ | ○ |
| *18-4 | 1.20 | 1.10 | △ | △ | △ | △ | ◎ | ○ | △ | ○ | △ |
| *18-5 | 1.30 | 1.05 | △ | △ | △ | △ | ◎ | △ | ○ | x | x |
| *18-6 | 1.15 | 0.90 | △ | △ | △ | ○ | ◎ | △ | ○ | △ | △ |
| *18-7 | 1.25 | 0.95 | △ | △ | △ | △ | ◎ | △ | ○ | △ | △ |
| *18-8 | 1.10 | 0.95 | △ | △ | △ | ○ | ◎ | △ | ○ | △ | △ |
| 18-9 | 1.05 | 1.00 | ○ | ○ | ○ | ○ | ◎ | ○ | ○ | ○ | ○ |
| 18-10 | 1.15 | 0.85 | ○ | ○ | ○ | ○ | ◎ | ○ | ○ | ○ | ○ |
| *18-11 | 1.20 | 0.90 | ○ | ○ | ○ | ○ | ◎ | ○ | △ | ○ | △ |
| 18-12 | 1.10 | 0.85 | ○ | ○ | ○ | ◎ | ◎ | ○ | ○ | ○ | ○ |
| *18-13 | 1.15 | 1.00 | △ | ○ | ○ | △ | ◎ | ○ | ○ | △ | △ |
| *18-14 | 1.0 | 0.95 | △ | ○ | ○ | ○ | ◎ | ○ | ○ | △ | △ |
| *18-15 | 1.05 | 0.90 | ○ | ○ | △ | ○ | ◎ | ○ | △ | ○ | △ |
| *18-16 | 0.9 | 0.75 | ○ | ○ | ○ | ○ | ◎ | ○ | △ | ○ | △ |
| *19 | 1.20 | 1.00 | △ | △ | x | ◎ | ◎ | △ | ○ | ○ | x |
| 20 | 0.95 | 0.85 | ○ | ○ | ○ | ◎ | ◎ | ○ | ○ | ○ | ○ |
| 21 | 0.90 | 0.85 | ○ | ○ | ◎ | ◎ | ◎ | ○ | ○ | ○ | ○ |
| 22 | 0.85 | 0.80 | ○ | ○ | ◎ | ◎ | ◎ | ○ | ○ | ○ | ○ |
| 23 | 0.80 | 0.75 | ○ | ○ | ◎ | ○ | ◎ | ○ | ○ | ○ | ○ |
| 24 | 0.90 | 0.90 | ○ | ○ | ◎ | ◎ | ◎ | ○ | ○ | ○ | ○ |
| 25 | 0.95 | 0.85 | ◎ | ○ | ◎ | ◎ | ◎ | ○ | ○ | ○ | ◎ |
| 26 | 0.95 | 0.80 | ◎ | ○ | ◎ | ○ | ◎ | ○ | ○ | ○ | ○ |
| 27 | 0.80 | 0.75 | ◎ | ○ | ◎ | ◎ | ◎ | ○ | ○ | ○ | ◎ |
| 28 | 0.90 | 0.80 | ◎ | ○ | ◎ | ◎ | ◎ | ○ | ○ | ○ | ◎ |
| 29 | 0.85 | 0.70 | ◎ | ○ | ◎ | ◎ | ◎ | ○ | ○ | ○ | ◎ |
| 30 | 0.75 | 0.75 | ◎ | ○ | ◎ | ◎ | ◎ | ○ | ○ | ○ | ◎ |
| 31 | 0.80 | 0.70 | ◎ | ○ | ◎ | ◎ | ◎ | ○ | ○ | ○ | ◎ |
| 32 | 0.90 | 0.80 | ○ | ○ | ◎ | ◎ | ◎ | ○ | ○ | ○ | ◎ |
| 33 | 0.85 | 0.75 | ◎ | ○ | ◎ | ◎ | ◎ | ○ | ○ | ○ | ◎ |
| 34 | 0.80 | 0.70 | ◎ | ○ | ◎ | ◎ | ◎ | ○ | ○ | ○ | ◎ |
| 35 | 1.40 | 0.55 | ○ | ○ | ○ | ◎ | ◎ | ○ | ○ | ○ | ○ |
| 36 | 1.35 | 0.65 | ○ | ○ | ○ | ◎ | ◎ | ○ | ○ | ○ | ○ |
| 37 | 1.00 | 0.95 | ◎ | ○ | ◎ | ◎ | ◎ | ○ | ○ | ○ | ○ |
| 38 | 0.30 | 0.90 | ◎ | ○ | ◎ | ◎ | ◎ | ○ | ○ | ○ | ◎ |
| 39 | 1.00 | 0.85 | ◎ | ○ | ◎ | ○ | ◎ | ○ | ○ | ○ | ○ |
| 40 | 1.50 | 0.75 | ○ | ○ | ○ | ○ | ◎ | ○ | ○ | ○ | ○ |

Notes:
1) Asterisks designate comparative examples not covered by the invention.

TABLE 10

| Item | ◎ | ○ | △ | x |
|---|---|---|---|---|
| Resistance to particle pull-out | 0–100Å | 100–200Å | 200–500Å | 500Å |
| Geometrical precision, undulation | 0–0.1 μm | 0.1–0.25 μm | 0.25–0.50 μm | 0.5 μm~ |
| Surface roughness | 0–1500Å | 1500–2500Å | 2500–5000Å | 5000Å |
| Warp, stress | 0–1 MPa | — | — | 1 MPa~ |
| Grinding force | — | Equivalent to or less than in conventional materials | — | More than in conventional materials |
| Hardness | — | — | $H_RA \geq 93$ | $H_RA < 93$ |
| Chipping | — | Equivalent to | | More than in |

TABLE 10-continued

| Item | ⊙ | ○ | Δ | × |
|---|---|---|---|---|
| | | or less than in conventional materials | | conventional materials |

The ratio $TiC_xO_yN_z/Al_2O_3$ refers to the ratio of the average crystallite size of $TiC_xO_yN_z$ to that of $\alpha\text{-}Al_2O_3$. The crystallite size was measured by scanning electron microscopy of lapped and etched surfaces of the material at a magnification of 5000.

The resistance to particle pull-out was evaluated by the change in surface roughness measured with a contact roughness gauge before and after heating to 1000° C. in an inert atmosphere and cooling.

The geometrical precision was evaluated by means of the undulation of the surface after machining.

The surface roughness refers to the surface after IBE.

The internal stress calculated from warp observed after the annealing for quality assurance was used as a measure of the warp during production of thin-film magnetic heads.

A sintered material according to the invention was used to fabricate a thin-film magnetic head, and it was observed that the material based on $Al_2O_3\text{-}TiC_xO_yN_z$, with crystallites of controlled size uniformly dispersed gave rise to a surface roughness lower than 2500 Å (0.25 μm) at the steps formed by IBE on the ABS and a resistance to particle pull-out ($R_{max}$) of less than 200 Å, thus achieving a low flying height suitable for MR heads.

Deformation of the substrate during the manufacture of MR heads proved to be very low due to the relaxation of internal stress by annealing.

In contrast, conventional substrate materials for magnetic heads obtained by HP or HIP sintering of known powders, as illustrated by specimens No.1–No.9 above, showed inferior surface roughness of the ABS formed by IBE, geometrical precision and deformation. This comparison demonstrates the superiority of the materials according to the invention.

The superiority of the materials according to the invention with respect to the resistance to particle pull-out, lapping characteristics, deformation during fabrication of thin-film heads, roughness of the surface after machining such as IBE, and ease of high precision machining is due to a stronger bond between $Al_2O_3$ and $TiC_xO_yN_z$ than in conventional materials.

Conventional materials prepared from $Al_2O_3$, TiC and additives simply mixed in a ball mill, have not always achieved uniform distribution of the components, as evidenced by scanning electron micrographs (×5000) showing 9 μm² square areas in which TiC crystallites are absent, which results in rather rough surfaces at steps formed on the surface. In contrast, the materials according to the invention proved, as demonstrated above, to be an excellent material that can be applied miniaturized thin-film heads in the future.

To help understand the materials according to the invention, examples of conversion of the composition are given in Table 8.

The molar, volume and weight percentages in the Table were calculated from results of analysis for the values X, Y and Z, and X-ray density obtained from the lattice constants given by X-ray diffraction.

The advantages of the present invention are summarized below:

(1) The strong bonding between crystallites provided by the $Al_2O_3\text{-}TiC_xO_yN_z$ matrix and the controlled crystallite size which is fine and uniform allow the material to meet all the requirements of substrate materials for magnetic heads, in addition to providing low surface roughness after IBE or other types of machining, and the possibility of fabrication of defect-free MR heads.

(2) The small amount of Mg or other metals and rare earth elements added to the $Al_2O_3\text{-}TiC_xO_yN_z$ matrix results in uniform structure without segregation of these components and decreased surface roughness due to difference in etching rates in formation of steps.

(3) The relaxation of internal stress results in small deformation during fabrication of thin-film heads and magnetic annealing of MR heads.

(4) The composition, crystallite size, amount of additive elements, and internal stress of the material as described above allow high precision machining needed for controlled low flying height and contribute to improved throughput in head production.

We claim:

1. Substrate materials for magnetic heads comprising a basic composition consisting of 24–75 mol % of $\alpha\text{-}Al_2O_3$ and the remaining 76–25 mol % of a phase having an NaCl structure with an average composition $TiC_xO_yN_z$, where $0.5 \leq X \leq 0.995$, $0.005 \leq Y \leq 0.30$, $0 \leq Z \leq 0.20$, and $0.505 \leq X+Y+Z \leq 1$, a compound containing 0.8–7.0 mol % with respect to 100 mol % of said basic composition of a metal selected from Mg, Ca, Zr and Cr, and a compound containing 0.03–0.8 mol % with respect to 100 mol % of said basic composition of at least one rare earth metal, the total concentration of said metal and rare earth elements being in a range of 0.83–7.03 mol %.

2. Substrate materials for magnetic heads according to in claim 1 wherein said compounds of Mg, Ca, Zr or Cr are oxides of these metals or spinels, solid solutions or compound oxides with $Al_2O_3$, and said rare earth compounds are oxides of rare earth elements, garnets with $Al_2O_3$, or intermetallic compounds of at least one of the rare earth elements and at least one of Al, Mg, Ca, Zr and Cr.

3. Substrate materials for magnetic heads according to claim 1 or 2 above wherein said basic composition consists of $\alpha\text{-}Al_2O_3$, $TiC_xO_yN_z$ and 2 mol % or less of $TiO_n$ where $n \leq 2$.

4. Substrate materials for magnetic heads according to claims 1 or 2, wherein said substrate materials have an average crystallite size of 0.3–1.5 μm, and a ratio of the crystallite size of $TiC_xO_yN_z$ to that of $Al_2O_3$ of 0.3–1.0.

5. Substrate materials for magnetic heads according to claims 1 or 2, wherein any 9 μm² square area on a surface of said substrate materials comprises either at least one crystallite of, or one aggregate particle containing, $TiC_xO_yN_z$, or a part of said crystallite or aggregate particle.

6. Substrate materials for magnetic heads according to claims 1 or 2, wherein said substrate materials have an internal stress of σ of 1 MPa or less, said δ being calculated by $$\sigma = (B/A) \times (Et/r^2) \times \delta \tag{1}$$

wherein A and B are constants depending on the geometry of the material (A=0.67 and B=1.24), E the Young's modulus of the material, t is the thickness of the substrate, r is the radius of a disk prepared from the material, and $\delta$ is the warp of said disk during annealing at a temperature of 70% or higher than the sintering temperature.

* * * * *